Feb. 5, 1935.  C. CRETIN  1,989,971

FILM CHECKING DEVICE FOR SYNCHRONIZED SOUND PICTURES

Filed July 6, 1929

INVENTOR
CHARLES CRETIN
BY
ATTORNEY

Patented Feb. 5, 1935

1,989,971

UNITED STATES PATENT OFFICE 1,989,971

FILM CHECKING DEVICE FOR SYNCHRONIZED SOUND PICTURES

Charles Cretin, Berlin, Germany, assignor to Telefunken Gesellschaft für Drahtlose Telegraphie m. b. H., Berlin, Germany, a corporation of Germany Application July 6, 1929, Serial No. 376,337

4 Claims. (Cl. 177—311)

In the production of synchronized talking moving pictures, it is necessary to check up the length of a relatively large number of copies with considerable accuracy in order to ascertain, in the case of a difference in the length of the copies, just where such differences exist.

It is the object of this invention to provide a system and means for accomplishing this checking of the films.

Other objects and uses of this invention will become apparent from the following specification taken in connection with the appended drawing.

For the purpose of this invention, a measuring device is used which not only indicates the measured length of the film in the term of units upon a scale, but which, say, upon each tenth picture, causes the flashing of a number or some other indication upon an indicator board or panel.

Attention is now invited to the accompanying drawing in which.

Figure 1:
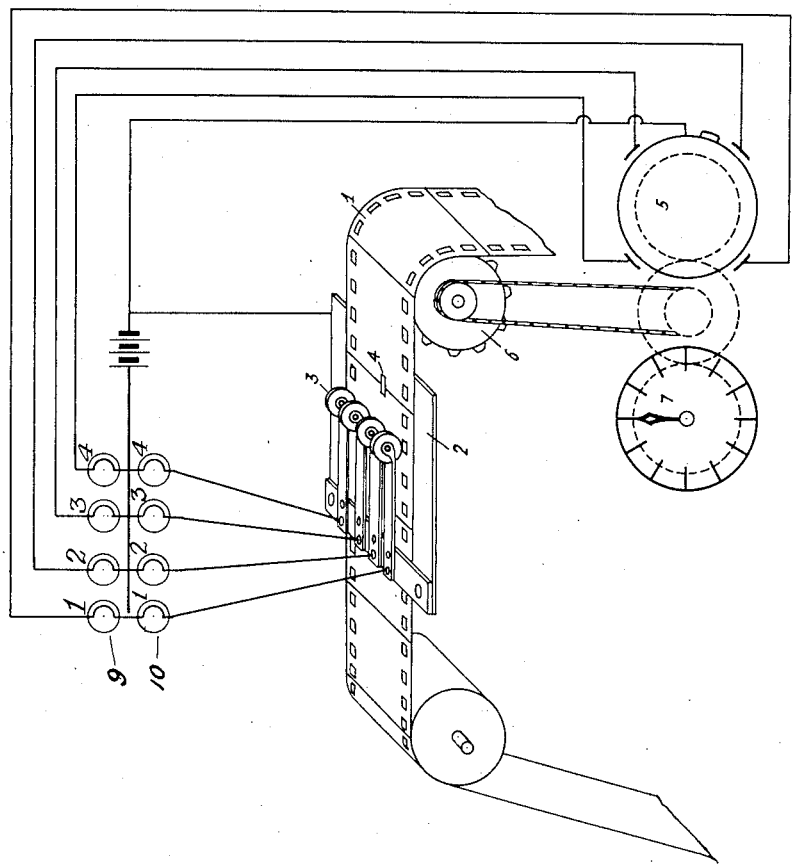
Fig. 1 is a schematic diagram showing the checking device in accordance with the present invention.

Referring now more particularly to Fig. 1, the film 1 passes over the contact plate 2 as driven by the sprocket 6. There are arranged the rollers 3 for contact with the contact plate 2 through the holes 4 which are punched in the film 1 at regular intervals. These holes are staggered from right to left so that the various rollers 3 will contact in sequence with the plate 2. Geared to the driving sprocket 6 by an appropriate arrangement is a contact maker 5 which is adapted to close a series of circuits in the same sequence as the contact rollers 3 in connection with the contact plate 2. Also geared by an appropriate arrangement to the sprocket 6 is the counter 7 for counting the length of travel of the film over the sprocket 6. There are provided two banks of indicating devices 9 and 10 having numerals 1—4, the lower, 10, of which is so connected that its indicators are actuated in sequence by the contact rollers 3 and the contact plate 2. The upper bank of indicators, 9, is adapted to have its circuits closed by the contact maker 5 in the same sequence by means of suitable electrical connections as shown.

Figure 2:
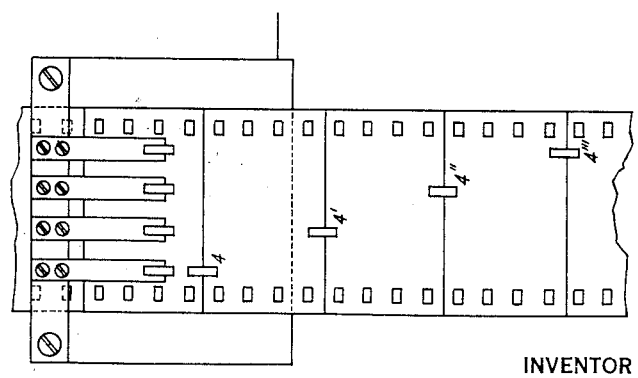
Fig. 2 is a plan view of the checking device and the film for cooperation therewith, which more clearly illustrates its action.

Referring now more particularly to Fig. 2, the film 1 is shown with a series of holes 4, 4', 4'', 4''', staggered from left to right, respectively, more clearly showing how the contact rollers 3 are connected with the contact plate 2 in sequence.

Having thus described my invention, I will now describe its operation. The film 1, which is to be checked up, travels over the contact plate 2. The contact rollers 3 engage the contact plate 2 through the holes 4 in the film and are adapted to close the corresponding contact for the lower signal lamps 1—4. These holes are staggered in relation to one another so that the four rollers 3 are caused to contact with the contact plate in sequence. The upper lamps or indicating devices 1—4 serve for checking the film. They are actuated by the contact device 5 in such a manner that, at each tenth picture, one of the upper lamps is caused to flash up. Since the counter device 5 is in positive coupling relation with the driving sprocket 6, an arrangement can be made so that the contact maker will synchronize with the contact making of the rollers 3 and the contact plate 2, with a result that the lower and the upper lamps 1—4 will flash up simultaneously. Thus the relationship between the measured length of the film and the actual appropriate films is continuously indicated.

The best plan is to provide the holes 4 after every tenth picture, so that the flashing of individual lamps will occur at intervals of about one second, assuming a travel of ten pictures per second. Thus the holes 4, 4', 4'', 4''' are not provided after every consecutive picture, as shown in Fig. 2, for the purpose of illustration, but after every tenth picture.

Whenever an irregularity arises as a consequence of gluing or tearing or mending, this will become evident from the irregularity in the flashing of the lower bank of lamps compared with the upper bank of lamps, as will be clearly understood from the above description. The total length of the film can be counted separately by the aid of the counter device 7.

Having thus described my invention, it is to be understood that I am not to be limited by the form shown and described for the purpose of illustration only, but by its scope as set forth in the appended claims.

I claim:

1. A film checking device including a film support, means for moving the film over said support, means coordinated with said film moving means for producing a series of successive indications repeated in the same order, and means cooperating with the film at the support for producing a similar series of indications when the continuity of the subject-matter of the film is not interrupted and for producing a different series of indications when said continuity is interrupted.

2. A film checking device including film moving means, means coordinated with said film moving means for producing a series of indications, indicating devices and control means coordinated with the film for causing said indicating devices to produce a series of indications similar to the first series when the continuity of the subject-matter of said film is not interrupted and for producing a different series of indications when said continuity is interrupted.

3. A film checking device including film moving means coordinated with the film, means coordinated with said film moving means for producing a series of indications, indicating devices, control means for causing said indicating devices to produce a series of indications similar to the first series when the continuity of the subject-matter of said film is not interrupted and to produce a different series of indications when said continuity is interrupted, and means for indicating the length of film checked previous to said interruption.

4. A film checking device including film moving means, means coordinated with said film moving means for producing a series of indications, indicating devices and control means coordinated with the film for causing said indicating devices to produce a series of indications similar to the first series when the continuity of the subject-matter of said film is not interrupted and to produce a different series of indications when said continuity is interrupted, and means operable to indicate at any instant the length of film checked.

CHARLES CRETIN.